Patented Nov. 18, 1952

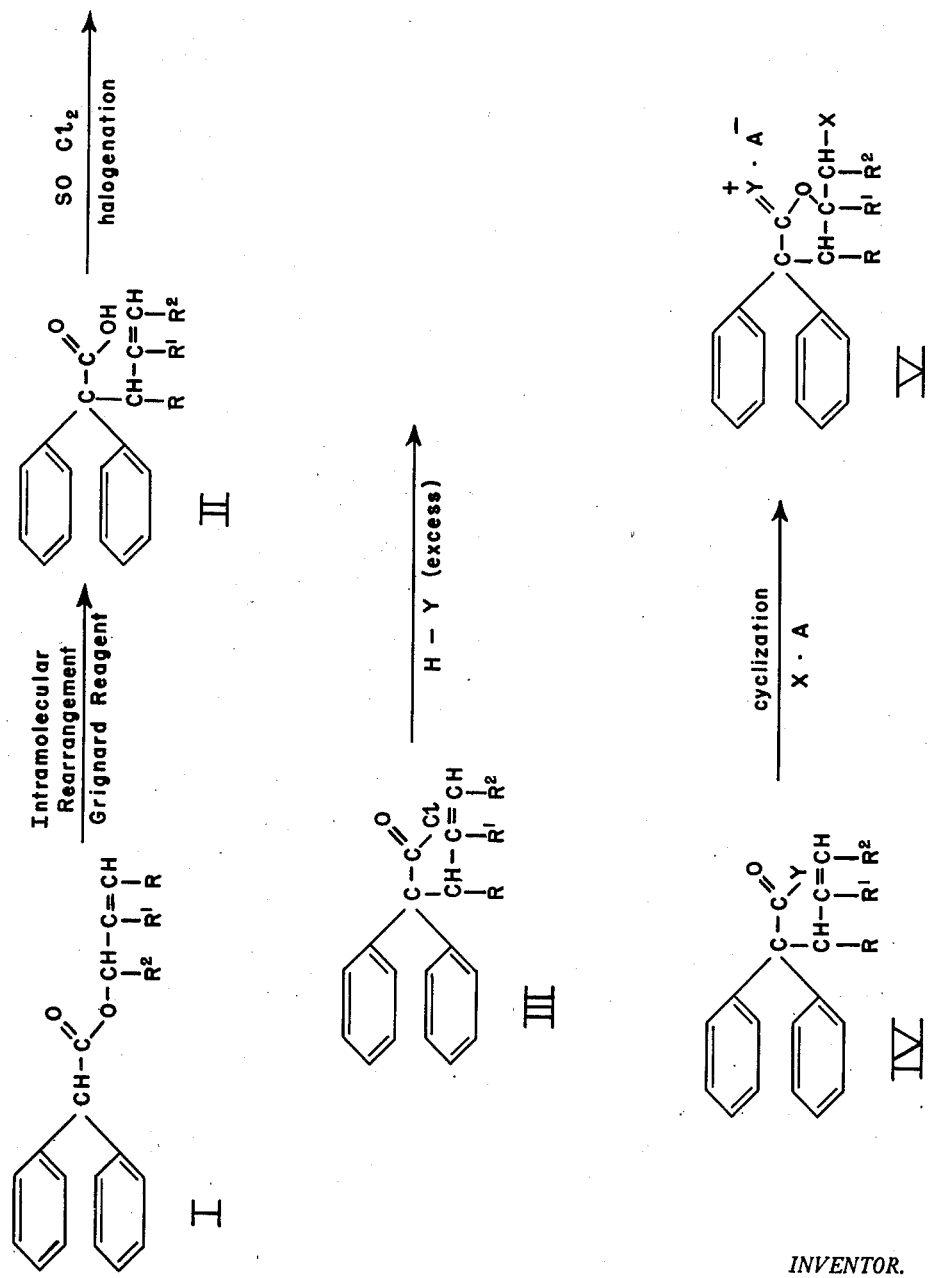

2,618,638

UNITED STATES PATENT OFFICE 2,618,638

TETRAHYDROFURANO IMMONIUM SALTS AND THEIR METHOD OF PREPARATION

Paul N. Craig, Pennsauken, N. J., assignor to Smith, Kline & French Laboratories, Philadelphia, Pa., a corporation of Pennsylvania Application February 7, 1950, Serial No. 142,925

8 Claims. (Cl. 260—247.7)

This invention relates to tetrahydrofurano immonium salts and their method of preparation.

The method according to this invention has been found to be economical and efficient for the preparation of the chemical compounds of this invention which have been found to have physiological activity, more particularly antispasmodic activity, and also to have utility as intermediates in the preparation of compounds, as, for example, amino lactones, having antispasmodic activity.

The method in accordance with this invention is adapted for the economic and efficient preparation of the compounds of this invention having the following structure:

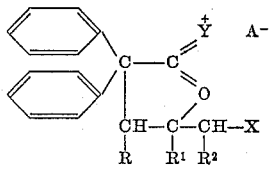

in which Y is a nitrogen linked amino radical selected from the group consisting of unsubstituted amino radicals, alicyclic amino radicals, heterocyclic amino radicals and mono- and di-substituted acyclic amino radicals, the substituents of which are selected from the group consisting of alkyl groups, substituted alkyl groups, aryl groups, and aralkyl groups; A is an anionic acid radical of a strong mineral acid; R, $R^1$ and $R^2$ are so selected from the group consisting of hydrogen and a methyl group that the total number of carbon atoms in R, $R^1$ and $R^2$ does not exceed one; X is a member of the group consisting of hydrogen, chlorine, bromine and iodine.

More specifically, the method in accordance with this invention is adapted for the production of the compounds of this invention having the following structure:

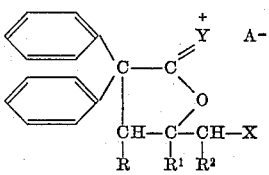

in which Y is selected from the group consisting of a piperidino radical, a morpholino radical, a pyrrolidino radical and unsubstituted, mono-, and di-substituted acyclic amino radicals, the substituents of which are selected from the group consisting of alkyl groups having not in excess of fourteen carbon atoms, a phenyl group, phenylalkyl groups, the alkyl portion of which does not exceed three carbon atoms, substituted alkyl groups having not in excess of five carbon atoms and the substituents of which are selected from the group consisting of a carboxy group, a hydroxy group, an amino group, chlorine and bromine; A is a member of the group consisting of $Cl^-$, $Br^-$, $I^-$, $HSO_4^-$, $H_2PO_4^-$, $NO_3^-$; R, $R^1$, $R^2$ are so selected from the group consisting of hydrogen and methyl that the total number of carbon atoms does not exceed one; X is selected from the group consisting of hydrogen, chlorine, bromine and iodine.

By way of exemplification of the utility of the method, it will be adaptable for the production, for example, of compounds having the following structures:

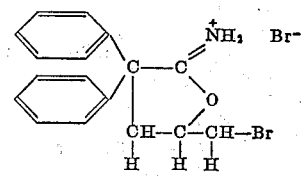

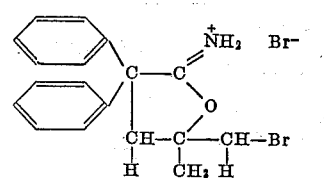

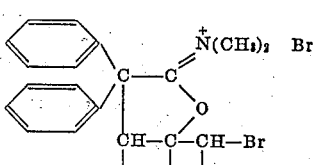

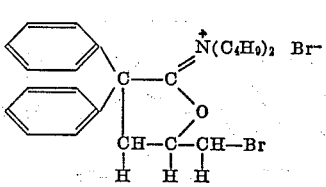

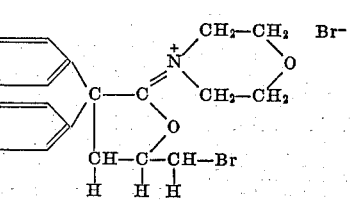

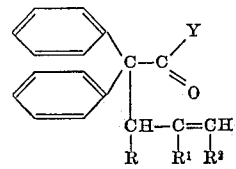

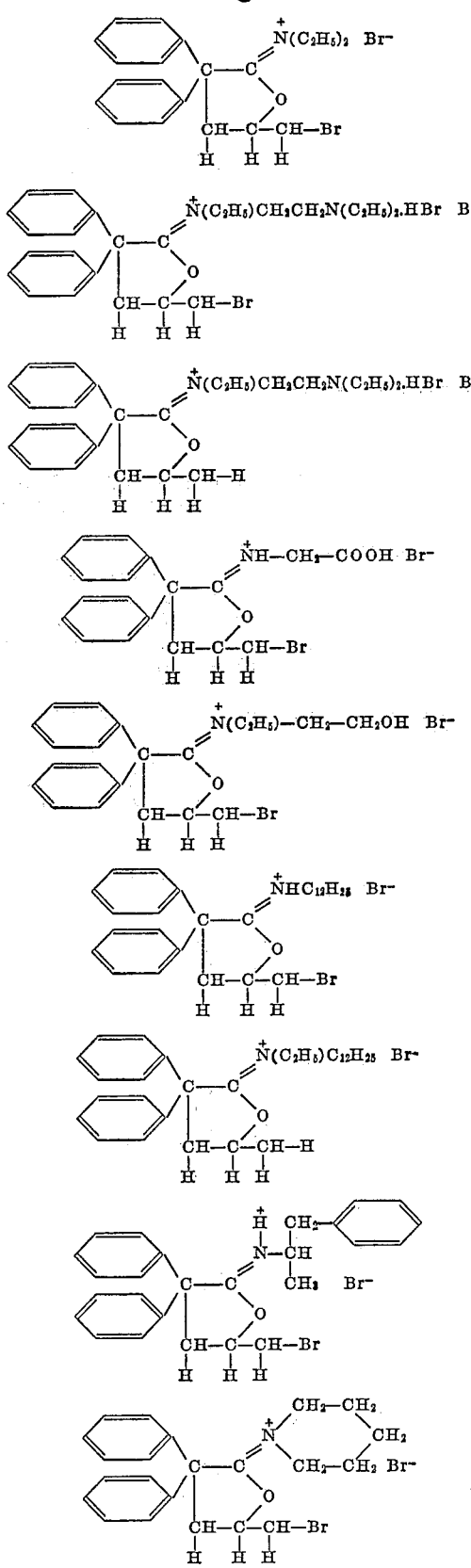

In the accompanying drawing which illustrates the several steps comprising the method according to this invention and in the following description, Y, A, R, R¹, R² and X will have the significance given above in connection with the above structural formulae.

The method in accordance with this invention involves essentially the conversion of an amide having the following structure:

wherein Y, R, $R^1$ and $R^2$ are as given above, to a heterocyclic ether immonium salt by cyclization which will be accomplished by reacting the amide with an electrophilic agent as a free halogen or a strong mineral acid usually in the presence of suitable solvent. Generally speaking, and with reference to the drawing which illustrates graphically the several steps involved in the method according to this invention, the compounds II will be prepared by the slow addition to compounds I, in the presence of a solvent, as, for example, benzene, of a Grignard reagent, sodium hydride, or other acid catalyst, with stirring; and refluxing after the addition of the reagent has been completed. The reaction mixture will then be extracted with alkali, dried and distilled. Acidification of the alkaline extract will yield compounds II in solid form. Alternatively the compounds II may be prepared from the compounds I by the procedure described by Arnold and Searles, J. Am. Chem. Soc., vol. 71, p. 450, (1949).

The compounds III will be prepared from the compounds II by treatment of the compounds II with a halogenating agent, as, for example, thionyl chloride, phosphorous pentachloride, or the like, in the presence of pyridine, with or without use of a solvent, in a well known manner. An excess of the halogenating agent will usually be used in order to carry the reaction to completion and such excess will, on completion of the reaction, be removed by usual procedures, such as distillation, or solvent extraction.

It will be noted that in the preparation of the compound 2,2 - diphenyl - 4 - methyl - 4 - pentenoyl chloride the use of pyridine will be essential. On completion of the reaction and removal of excess halogenating agent, the resulting acyl halide, compounds III, will be purified either by distillation in vacuo or by crystallization from a suitable solvent. Variously in proceeding for the preparation of compounds in accordance with this invention it will be found more convenient to utilize the solution resulting from the reaction without such purification.

The compounds IV will be prepared from the compounds III by converting the acyl halide, compounds III, to the amides, compounds IV, by reacting compounds III with an appropriate amine, which may be added to the compounds IV in the form of a benzene solution.

Finally, the compounds V will be prepared from the compounds IV by cyclization of the amides, compounds IV, which will be accomplished by reacting the compounds IV in the presence of a suitable solvent, as, for example, carbon tetrachloride, benzene, or chloroform, with an electrophilic reagent such as, for example, a free halogen or strong mineral acid, such as sulfuric, nitric, or the like, evaporation of the solvent and recrystallization of the compounds V, from any suitable solvent, such, for example, as ethanol, acetone, or methanol.

As illustrative of compounds IV, amides, which will be prepared from compounds I above described and which will be used for carrying out the method in accordance with this invention, the following may be mentioned, it being noted that in the preparation of the imino ethers any of the amino portions of the following compounds may be combined with any of the alkenoic acid portions shown:

Starting materials (amides)

| Alkenoic acid Portions | Amino Portions |
|---|---|
| | $-NH_2$ |
| | $-N\begin{smallmatrix}CH_3\\CH_3\end{smallmatrix}$ |
| | $-N\begin{smallmatrix}C_2H_5\\C_2H_5\end{smallmatrix}$ |
| | $-N\begin{smallmatrix}C_8H_{17}\\H\end{smallmatrix}$ |
| (diphenyl allyl acetate structure) | $-N\begin{smallmatrix}C_4H_9\\C_4H_9\end{smallmatrix}$ |
| | $-N\begin{smallmatrix}CH_3\\C_{12}H_{25}\end{smallmatrix}$ |
| | $-NHC_{12}H_{25}$ |
| | $-NH-CH-CH_2-C_6H_5$ <br> $\quad\;\; |$ <br> $\quad\;\;CH_3$ |
| | $-N\begin{smallmatrix}C_2H_5\\CH_2-CH_2-OH\end{smallmatrix}$ |
| (diphenyl methallyl structure) | $-N\begin{smallmatrix}C_2H_5\\CH_2-CH_2-N(C_2H_5)_2\end{smallmatrix}$ |
| | $-N\begin{smallmatrix}C_2H_5\\CH_2-CH_2Cl\end{smallmatrix}$ |
| | $-NH-CH_2-COOH$ |
| (diphenyl methallyl structure) | $-N\begin{smallmatrix}CH_3\\CH_2-CH_2-C_6H_5\end{smallmatrix}$ |
| | $-N\begin{smallmatrix}C_6H_5\\C_6H_5\end{smallmatrix}$ |
| | $-N\begin{smallmatrix}CH_3\\C_6H_5\end{smallmatrix}$ |
| (diphenyl crotyl structure) | $-N\begin{smallmatrix}CH_2-CH_2\\\;\;\;\;\;\;\;\;\;\;\;\;\;\;\;\\CH_2-CH_2\end{smallmatrix}$ |
| | $-N\begin{smallmatrix}CH_2-CH_2\\\;\;\;\;\;\;\;\;\;\;\;\;\;\;\;CH_2\\CH_2-CH_2\end{smallmatrix}$ |
| | $-N\begin{smallmatrix}CH_2-CH_2\\\;\;\;\;\;\;\;\;\;\;\;\;\;\;\;O\\CH_2-CH_2\end{smallmatrix}$ |

The following examples will more specifically exemplify the several compounds in accordance with this invention as broadly and specifically defined by the foregoing general formulae and method and procedure for their preparation will be made fully apparent:

EXAMPLE 1

3,3-diphenyl-5-bromomethyltetrahydrofuran-2-immonium bromide

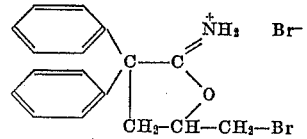

The mesityl Grignard reagent prepared from 25 grams of bromomesitylene, 3.1 grams of magnesium turnings, 0.05 gram magnesium powder, and 75 ml. of anhydrous ether in the usual manner will be added with stirring to a solution of 25 g. of allyl diphenylacetate and 50 ml. of anhydrous ether. The reaction mixture is refluxed one hour after completion of addition and after being allowed to stand overnight at room temperature, it is decomposed with slightly acidified ammonium chloride solution. The ether solution is extracted thoroughly with 5% sodium hydroxide solution and with water. Acidification of the alkaline solution with concentrated hydrochloric acid caused the 2,2-diphenyl-4-pentenoic acid to crystallize out of solution. Recrystallization from ethanol with water yielded a crystalline product melting at 141–142° C.

A mixture of 25 g. of pentenoic acid prepared above and 25 g. of thionyl chloride is heated on the steam bath for one hour while air is blown through the flask. The brown oil is poured onto excess concentrated ammonium hydroxide with stirring and allowed to stand overnight. The cake is crushed, filtered, and washed with large quantities of water to remove sulfur compounds. The product is distilled, using a sausage flask; B. P. 180–190°/0.8 to 1.2 mm. The product solidifies on standing and is recrystallized from benzene and petroleum ether; M. P. 77–78°.

A solution of 2 gms. of the amide in 25 gms. of carbon tetrachloride is treated by adding bromine dropwise until there is no further precipitate formed. After the addition of ether to the reaction mixture, the immonium bromide is filtered as a yellow powder which melts at 233–235° C.

EXAMPLE 2

3,3-diphenyl-5-bromomethyltetrahydrofuran-2-dimethyl-immonium bromide

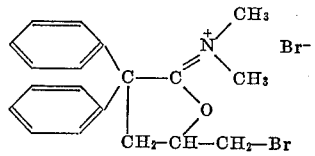

A mixture of 20 gms. of diphenylpentenoic acid prepared as an intermediate in Example 1 and 25 ml. of thionyl chloride is heated twenty-five minutes on the steam bath while air is blown into the flask. After evacuation by a water aspirator to remove the thionyl chloride and hydrogen chloride, the residue is added with mechanical stirring to 250 ml. of 25% aqueous dimethylamine. Much heat is evolved and cooling is required. After fifteen minutes, the aqueous layer is washed with chloroform and the combined organic layers give recovered acid on acidification. The chloroform is removed by evaporation and the residual oil is recrystallized from benzene and petroleum ether. Large crystals, melting at 110–112° are obtained. A second crop is obtained from acetone and water; M. P. 97–105°.

A small portion is recrystallized from ethanol and water to give white needles melting at 110–111°.

A solution of 6.0 gm. of dimethyl-2,2-diphenyl-4-pentenamide in 120 ml. of carbon tetrachloride is treated with bromine in carbon tetrachloride (10% solution) until an excess of bromide is added, as shown by the formation of a dark red color. Ether is added, and the liquid is decanted from the tarry solid. Acetone and ethanol are added and the mixture is heated to effect solution and reaction of excess bromine with acetone. Evaporation on the steam bath gives a light colored tar, which is crystallized twice from chloroform and ether to give white crystals melting at 194–197° C.

EXAMPLE 3

*3,3 - diphenyl - 5 - methyltetrahydrofuran - 2 - dimethylimmonium chloride*

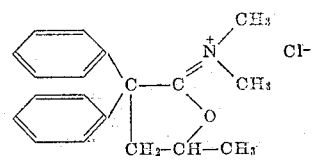

The dimethyl - 2,2 - diphenyl - 4 - pentenamide prepared as an intermediate in Example 2 above is treated with an aqueous solution of hydrochloric acid in excess. Evaporation and crystallization gives crystals of 3,3-diphenyl-5-methyltetrahydrofuran-2-dimethylimmonium chloride.

EXAMPLE 4

*3,3 - diphenyl - 5 - bromomethyltetrahydrofuran - 2 - diethylimmonium bromide*

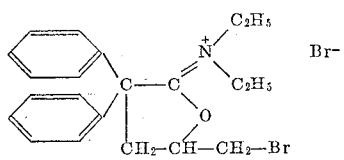

A mixture of 10.0 gm. of crude diphenylpentenoylchloride prepared as an intermediate in Example 1 and 20 gm. of diethylamine in 50 cc. of benzene is stirred on the steam bath for five minutes, dilute hydrochloric acid is added to remove the excess diethylamine and the benzene layer is washed with water. Distillation gives an oil; B. P. 185–195°/3–5 mm. The product crystallizes on standing. Recrystallization of a sample from petroleum ether (B. P. 40–60°) gives crystals melting at 93.5–94.5°.

A solution of 8.6 gm. of the diethylamine prepared above in 100 ml. of carbon tetrachloride is treated with a solution of bromine in carbon tetrachloride until an excessive amount of bromine has been added as shown by the formation of a dark red color. The solution is evaporated on the steam bath, the resulting tar is dissolved in water, and extracted twice with benzene. The aqueous solution is evaporated in vacuo; the resulting semi-crystalline mass is recrystallized from 99% isopropanol and ether. White crystals are obtained melting at 194–196°. A recrystallization from isopropanol and ether gives product melting at 195–196°.

EXAMPLE 5

*3,3 - diphenyl - 5 - bromomethyltetrahydrofuran - 2 - dibutylimmonium bromide*

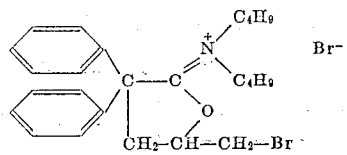

10 gms. of 2,2-diphenyl-4-pentenoyl chloride, prepared as an intermediate in Example 1, is added to 15 gms. of dibutyl amine dissolved in 50 gms. of benzene. After warming on the steam bath for 15 minutes, the mixture is extracted with water and hydrochloric acid. Distillation of the organic layer gives 11 grams of amide B. P. 191–198° C. at 0.1 mm. Hg.

The dibutyl amide is dissolved in carbon tetrachloride and bromine is added to the solution until there is no further precipitation. The addition of ether causes the product to crystallize, but an attempt at recrystallization from isopropanol and ether yields a viscous oily product which is water-soluble.

EXAMPLE 6

*3,3 - diphenyl - 5 - bromomethyltetrahydrofuran - 2 - methyldodecylimmonium bromide*

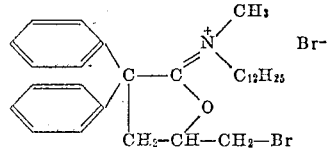

2,2-diphenyl-4-pentenoyl halide prepared as an intermediate in the method described for Example 1 is reacted with methyl dodecyl amine in benzene in a manner identical with that described for Example 4. The resulting amide is reacted with bromine in carbon tetrachloride as described in Example 4 to form 3,3 - diphenyl - 5 - bromomethyltetrahydrofuran-2-methyldodecylimmonium bromide.

EXAMPLE 7

*3,3-diphenyl-5-methyltetrahydrofuran-2 - methyldodecyl-immonium bromide*

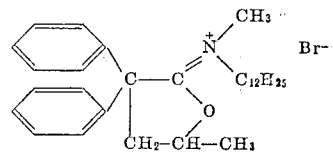

N-methyl-N-dodecyl-2,2-diphenyl-4-pentenoyl amide is prepared as an intermediate in Example 6. The heterocyclic immonium ether may be prepared from this amide by reaction with hydrogen bromide in carbon tetrachloride to form the end product.

EXAMPLE 8

*3,3-diphenyl-5-bromomethyltetrahydrofuran-2-dodecyl-immonium bromide*

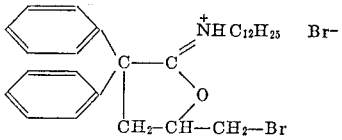

2,2-diphenyl-4-pentenoyl chloride prepared as an intermediate in Example 1 is reacted with dodecylamine to form the N-dodecyl diphenylpentenoyl amide. Treatment of the amide with free bromine in the manner as described above forms the heterocyclic dodecyl immonium ether.

EXAMPLE 9

*3,3-diphenyl-5-bromomethyl-tetrahydrofuran-2-(N-ethyl-N-β-hydroxyethyl)-immonium bromide*

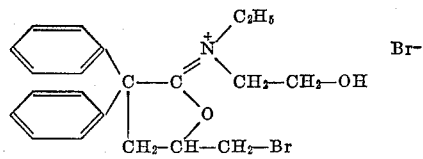

A solution of 5.0 gm. of crude diphenylpentenoyl chloride prepared as an intermediate in Example 1 in 20 ml. of benzene is mixed with 3.5 gm. of ethyl monoethanolamine. The solution is warmed and crystals soon form. After stirring five minutes ether is added. On filtration ethyl monoethanolamine hydrochloride is obtained. The residue is treated with gaseous hydrogen chloride and the same amine hydrochloride is obtained. The residue from the above filtration is evaporated to dryness, and recrystallized from petroleum ether. A further recrystallization gives crude product. Recrystallization from benzene and petroleum ether gives an analytical sample melting at 121–123°.

The reaction of the above formed amide with free bromine as described above will form the heterocyclic immonium ether of the above structure.

EXAMPLE 10

*3,3-diphenyl-5-bromomethyltetrahydrofuran-2-(N-ethyl-N-diethylaminoethyl)-immonium bromide*

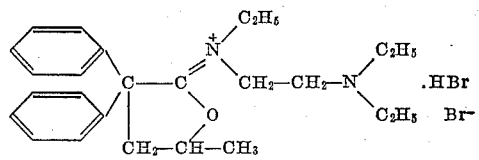

The diphenylpentenoyl chloride formed above in Example 1 as an intermediate will be reacted with N-ethyl-N-diethylaminoethyl amine to form the corresponding amide which will be reacted with hydrobromic acid as described in Example 7 above to form a corresponding heterocyclic immonium ether.

EXAMPLE 11

*3,3-diphenyl-5-(α-chloroethyl)-tetrahydrofuran-2-dimethyl-immonium chloride*

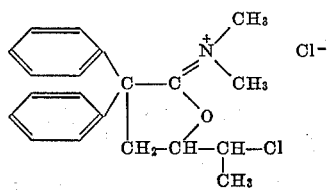

This compound will be prepared from isocrotyldiphenyl acetate which is rearranged to form 2,2-diphenyl-4-hexenoic acid by the use of 10.75 gms. of bromomesitylene, 1.30 gms. of magnesium turnings, 50 ml. of anhydrous ether, which was refluxed for six hours, filtered through glass wool and added to a stirred solution of 11.5 gms. of the isocrotyldiphenylacetate in 50 ml. of anhydrous ether. When the addition is completed the mixture is warmed under reflux for 30 minutes and then allowed to stand at room temperature 40 hours. The ether solution is extracted thoroughly with 5 per cent sodium hydroxide solution, washed with water, dried over sodium sulfate, filtered and distilled. Acidification of the alkaline extract with dilute HCl yields a light oil which crystallizes after standing and is collected by filtration; M. P. 120–121.5° C.

The 2,2-diphenyl-4-hexenoyl chloride is prepared from the acid formed above by treatment with thionyl chloride in pyridine followed by extraction with benzene. The crude solution of the acyl chloride is used as such in the preparation of the amide which is formed by the reaction of the acyl halide with dimethyl amine dissolved in benzene. After warming the mixture in the steam bath for 15 minutes, it is extracted with water and hydrochloric acid. Distillation of the organic layer gives the diphenyl hexenoyl amide.

When the above formed amide so dissolved in carbon tetrachloride is treated by bubbling free chlorine through the solution, the cyclization takes place to form the 5-(α-chloroethyl) heterocyclic immonium ether.

EXAMPLE 12

*3,3-diphenyl-5-bromomethyltetrahydrofuran-2-carboxymethyl-immonium bromide*

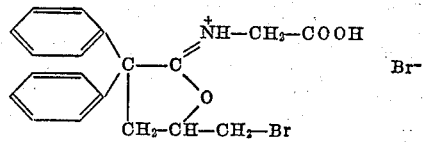

The preparation of glycine ethyl ester from the hydrochloride gives 1.4 g. from 10 g. of starting hydrochloride. To this is added benzene and 0.7 g. of crude 2,2-diphenyl-4-pentenoyl chloride, formed as an intermediate in Example 1 above. A precipitate forms immediately and after the addition of several cubic centimeters of 5% sodium bicarbonate, the mixture is shaken five minutes. The benzene layer is separated; evaporation of the benzene leaves a residual oil. The oil, presumed to be the ethyl ester amide, is heated on the steam bath for four hours with 10% sodium hydroxide and ethanol. The resulting solution is diluted to 200 ml., and extracted with ether. The water extract is acidified with hydrochloric acid and crystals result on cooling. Recrystallization from alcohol and water gives a crystalline product; M. P. 144–146°.

Reaction of the above formed amide with free bromine in the manner described above forms the heterocyclic immonium ether end product.

EXAMPLE 13

*3,3-diphenyl-5-methyl-5-bromomethyltetrahydrofuran-2-dimethylimmonium bromide*

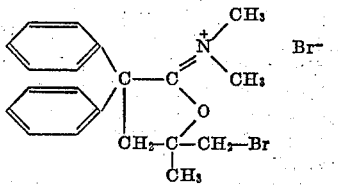

Using the procedure described under Example 11 for the rearrangement of the isocrotyl ester of diphenylacetic acid, β-methallyl diphenyl acetate in an equivalent amount is rearranged to 2,2-diphenyl-4-methyl-4-pentenoic acid, melting at 122.2 to 122.6° C.

A solution of 5.3 gm. of 2,2-diphenyl-4-methyl-4-pentenoic acid in 4 gm. of pyridine is treated with 4 gm. of thionyl chloride in 20 ml. benzene. After spontaneous formation of heat, an oil separates. Two aqueous extracts of the benzene layer are made, and the benzene solution is boiled to remove water. The solution of acyl chloride can be used without further purification. The acid chloride is characterized by formation of the diethyl amide by usual procedure; M. P. 83–4° C.

The dimethyl amide formed from the above prepared acyl chloride by the usual procedure is treated with free bromine and carbon tetrachloride as described above to prepare 3,3-diphenyl - 5 - methyl - 5 - bromomethyltetrahydrofuran - 2 - dimethylimmonium bromide.

EXAMPLE 14

*3,3-diphenyl-5-methyltetrahydrofuran-2-(N-methyl-N-phenylethyl)-immonium sulfate*

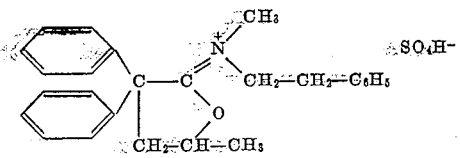

2,2-diphenyl-4-pentenoyl chloride prepared as an intermediate in Example 1 above is reacted with N-methyl-N-phenylethylamine to form the amide which, in turn, is reacted with concentrated sulfuric acid in carbon tetrachloride as a solvent and which forms the 3,3-diphenyl-5-methyltetrahydrofuran - 2 - (N-methyl - N - phenylethyl) immonium sulfate.

EXAMPLE 15

*3,3-diphenyl-4-methyl-5-bromomethyltetrahydrofuran-2-diphenyl-immonium bromide*

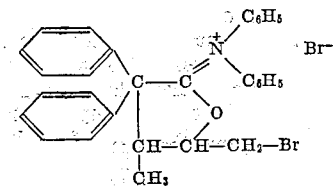

A solution of 13.0 gm. of n-crotyl alcohol and 14.5 gm. of dry pyridine is added over a period of thirty minutes to a stirred solution of 34.7 gm. of diphenylacetyl chloride in 50 ml. of dry chloroform at 0°. After being allowed to stand eight hours at 10°, the reaction mixture is washed with dilute hydrochloric acid, dilute sodium hydroxide and water, dried over sodium sulfate and filtered. The solvent is removed by distillation under the pressure of a water pump, and the distillation residue crystallized as white needles when cooled in an ice bath; M. P. 17.5–21.5°. Since the melting point is not changed by recrystallization from petroleum ether (B. P. 28–38°), the product is distilled in a modified Claisen flask having the side stem packed with glass helices, under the pressure of the mercury vapor pump; B. P. 155–162° C. (about 0.001 mm.), a colorless oil.

The mesityl Grignard reagent prepared from 12.0 gm. of bromomesitylene, 1.5 gm. magnesium turnings, a few milligrams of magnesium powder and 50 ml. of absolute alcohol is added with stirring to a solution of 12.5 gm. of n-crotyl diphenylacetate in 25 ml. of dry ether. The reaction mixture is refluxed 12 hours and allowed to stand overnight. It is decomposed with slightly acidified chloride solution, and the ether layer extracted with 5 per cent. sodium hydroxide. The solvent is removed from the ether by distillation under atmospheric pressure, and the residue is distilled under reduced pressure to yield mesitylene; B. P. 62–64° (20 mm.). Acidification of the aqueous alkaline solution with dilute hydrochloric acid causes a tan oil to seperate. This crystallizes after standing overnight and is collected on a filter; M.P. 131–132°; recrystallization from aqueous alcohol raises the melting point to 138–138.5° C.

The 2,2-diphenyl-3-methyl-4-pentenoic acid prepared above is treated with thionyl chloride in the usual manner to form the corresponding acid chloride. The acid chloride so formed will be reacted with diphenylamine in the manner described in Example 4 to form the corresponding amide. The diphenyl amide is then treated with free bromine in carbon tetrachloride to form the corresponding heterocyclic diphenyl immonium ether.

EXAMPLE 16

*3,3 - diphenyl - 5 - bromomethyltetrahydrofuran-2-phenylmethylimmonium bromide*

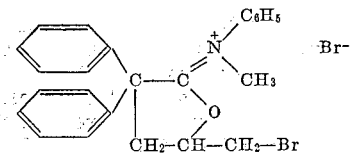

2,2-diphenylpentenoyl chloride prepared as an intermediate in Example 1 is treated with N-methylaniline in the usual manner to form the corresponding amide which, in turn, rearranges upon treatment with free bromide to form the heterocyclic immonium ether of the above structure.

EXAMPLE 17

*3,3 - diphenyl - 5 - bromomethyltetrahydrofuran-2-dibenzyl-immonium bromide*

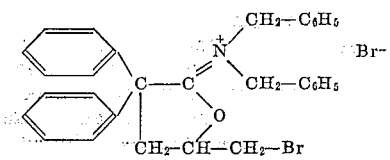

The diphenylpentenoyl chloride prepared as an intermediate in Example 1 above is reacted with dibenzyl amine to form the corresponding amide. The reaction of the dibenzyl amide with free bromine will cause rearrangement to the dibenzyl immonium heterocyclic ether.

EXAMPLE 18

*3,3 - diphenyl - 5 - bromomethyltetrahydrofuran-2-pyrrolidinium bromide*

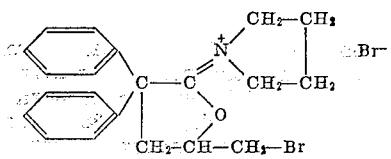

A solution of the diphenylpentenoyl chloride prepared in Example 4 is reacted with pyrrolidine to form the diphenylpentenoyl pyrrolidide. The reaction of this amide with free bromine in the usual manner causes rearrangement to form the heterocyclic pyrrolidinium ether.

EXAMPLE 19

*3,3 - diphenyl - 5 - bromomethyltetrahydrofuran-2-piperidinium bromide*

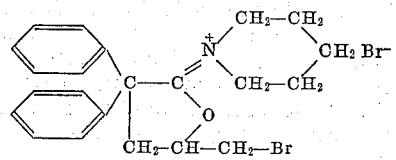

2,2-diphenyl-4-pentenoyl piperidide is formed by the interaction of piperidine and a crude solution of diphenylpentenoyl chloride formed as an intermediate in Example 1 above. Treatment of the piperidide with free bromine causes it to rearrange to the heterocyclic piperidinium ether.

EXAMPLE 20

*3,3 - diphenyl - 5 - bromomethyltetrahydrofuran-2-morpholinium bromide*

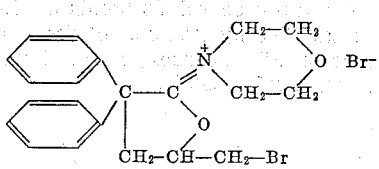

A mixture of 10 gm. of crude diphenylpentenoylchloride, 50 ml. of benzene, and 20 ml. of morpholine is stirred ten minutes on the steam bath. After washing the benzene layer with dilute hydrochloric acid and water, distillation gives product distilling at 200–260°/2.5–3.0 mm. The product crystallizes on standing. Recrystallization of a sample from petroleum ether gives crystals melting at 96–98°.

A solution of 9.7 gm. of 2,2-diphenyl-4-pentenemorpholide in carbon tetrachloride is treated with bromine in carbon tetrachloride until a definite bromine color persists. After evacuation on the steam bath, an orange, tarry solid results. Recrystallization from 99% isopropanol and ether gives product of M. P. 194–195°.

EXAMPLE 21

*3,3 - diphenyl - 5 - bromoethyltetrahydrofuran - 2 - (N - ethyl - N - β - chloroethyl) - immonium chloride*

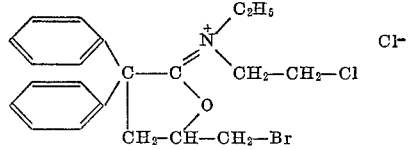

The compound, 3,3-diphenyl-5-bromomethyltetrahydrofuran - 2 - (N - ethyl - N - β - hydroxyethyl) -immonium bromide, is formed as the end product in the procedure described for Example 9. Treatment of this compound with thionyl chloride using chloroform as a solvent will convert the starting material to the above product.

EXAMPLE 22

*3,3 - diphenyl - 5 - bromomethyltetrahydrofuran - 2 - (N - β - phenylisopropyl) - immonium bromide*

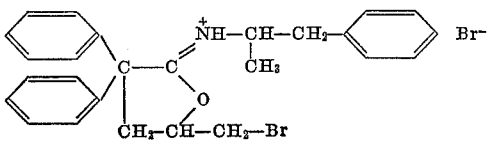

The acid chloride prepared from 25 g. of 2,2-diphenyl-4-pentenoic acid (prepared as an intermediate in Example 1) is reacted with 28.5 g. of d,1-amphetamine (1-phenyl-2-aminopropane) in 100 ml. of benzene. After heating at reflux temperature for 15 minutes, the reaction mixture is cooled and filtered to separate the unreacted amphetamine. Distillation of the residual liquid yields the amide, β-phenylisopropyl-2,2-diphenyl-4-pentenamide, a light yellow oil, boiling at 203–205° C. under 0.3 mm. pressure of Hg, which later solidifies with a melting point of 58 to 60.5° C.

When the amide so formed is dissolved in carbon tetrachloride and treated with excess bromine, the desired heterocyclic ether immonium bromide is formed and is isolated by evaporation of the solvent and excess bromine to yield a white, high melting residue, 3,3-diphenyl-5-bromomethyltetrahydrofuran - 2 - (N - β - phenylisopropyl) -immonium bromide.

As has been indicated, the compounds according to this invention have been found to have physiological activity, more particularly antispasmodic activity and further that they are useful as intermediates in the preparation of compounds having physiological activity. Lactones may be prepared from the compounds according to this invention by hydrolysis of such compounds.

This application is a continuation-in-part of S. N. 139,100, filed January 17, 1950, now abandoned.

What is claimed is:

1. The compound having the structure:

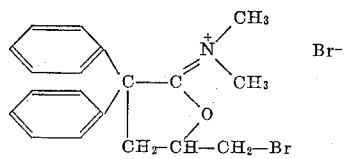

2. The compound having the structure:

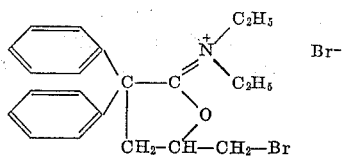

3. The compound having the structure:

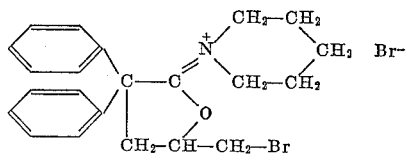

4. The compound having the structure:

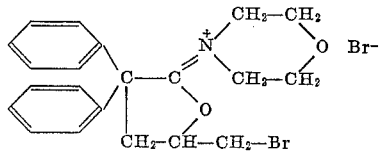

5. The compound having the structure:

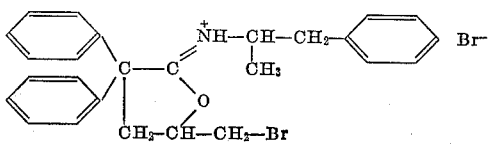

6. The method of producing tetrahydrofurano immonium salts having the following structure:

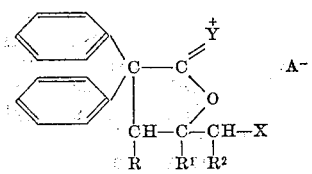

in which Y is a nitrogen-linked immonium radical the remaining co-valent bonds of the nitrogen being satisfied by members of the group consisting of hydrogen, lower alkyl, carboxy lower alkyl, phenyl, phenyl lower alkyl radicals,

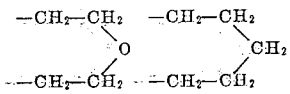

and

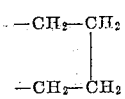

A is an anionic radical of a strong mineral acid; R, R¹ and R² are so selected from the group consisting of hydrogen and a methyl group that the total number of carbon atoms does not exceed one; and X is a member of the group consisting of hydrogen, chlorine, bromine and iodine, which comprises refluxing an allylic ester of diphenyl acetic acid having the following structure:

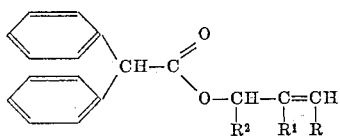

with an aralkyl magnesium halide in a low boiling, inert organic solvent to effect intramolecular rearrangement to the coresponding 2,2-diphenyl-4-alkenoic acid, heating the latter with thionyl chloride to convert it to the acyl halide, adding an excess of an amine, at least one of the valences of which is satisfied by hydrogen, to form the alkene amide, and adding to the alkene amide so formed an electrophilic reagent selected from the group consisting of a free halogen and strong mineral acid in an inert solvent to effect rearrangement to the corresponding tetrahydrofurano immonium salt.

7. The step in the method according to claim 6 which comprises adding to the alkene amide an electrophilic reagent selected from the group consisting of free halogen and strong mineral acids in an inert solvent to effect rearrangement to the corresponding tetrahydrofurano immonium salt.

8. Compounds having the structure:

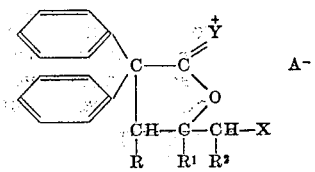

in which Y is a nitrogen-linked immonium radical the remaining co-valent bonds of the nitrogen being satisfied by members of the group consisting of lower alkyl, carboxy lower alkyl, phenyl, phenyl lower alkyl radicals,

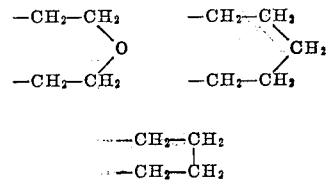

and

—CH₂—CH₂
|
—CH₂—CH₂

A is an anionic acid radical of a strong mineral acid; R, R¹ and R² are so selected from the group consisting of hydrogen and methyl that the total number of carbon atoms does not exceed one; and X is selected from the group consisting of hydrogen, chlorine, bromine and iodine.

PAUL N. CRAIG.

REFERENCES CITED

The following references are of record in the file of this patent:

UNITED STATES PATENTS

| Number | Name | Date |
| --- | --- | --- |
| 2,262,262 | Speer | Nov. 11, 1941 |